United States Patent [19]

Hochgesand et al.

[11] Patent Number: 4,522,730
[45] Date of Patent: Jun. 11, 1985

[54] PROCESS FOR THE TREATMENT OF AN AQUEOUS CONDENSATE

[75] Inventors: Gerhard Hochgesand, Heusenstamm, Fed. Rep. of Germany; Heinz Kahles, Johannesburg-Meredale, South Africa; Paül Wiesner, Friedrichsdorf; Hans-Martin Stönner, Schwalbach, both of Fed. Rep. of Germany

[73] Assignee: Metallgesellschaft Aktiengesellschaft, Frankfurt am Main, Fed. Rep. of Germany

[21] Appl. No.: 591,851

[22] Filed: Mar. 21, 1984

[30] Foreign Application Priority Data

Mar. 24, 1983 [DE] Fed. Rep. of Germany ....... 3310712

[51] Int. Cl.³ ............................ C02F 1/20; C02F 1/58
[52] U.S. Cl. .................................... 210/750; 210/904; 55/48; 55/53; 55/68; 55/70
[58] Field of Search .............. 210/716, 718, 750, 757, 210/737, 806, 904, 916; 55/38, 42, 44, 48, 53, 70, 73, 68; 48/202

[56] References Cited

U.S. PATENT DOCUMENTS

| | | | |
|---|---|---|---|
| 3,540,867 | 11/1970 | Baron et al. | 48/197 |
| 3,972,693 | 8/1976 | Wiesner et al. | 55/42 |
| 4,031,030 | 6/1977 | Rudolph | 48/202 X |
| 4,060,591 | 11/1977 | Garber et al. | 55/70 X |
| 4,065,273 | 12/1977 | Rudolph | 55/50 |
| 4,132,636 | 1/1979 | Iwase et al. | 210/904 X |
| 4,311,597 | 1/1982 | Bhattacharyya | 210/904 X |
| 4,347,063 | 8/1982 | Reh et al. | 48/202 X |

FOREIGN PATENT DOCUMENTS

| | | |
|---|---|---|
| 2229213 | 1/1974 | Fed. Rep. of Germany . |
| 2542055 | 3/1977 | Fed. Rep. of Germany . |
| 2543532 | 3/1977 | Fed. Rep. of Germany . |
| 2527985 | 4/1977 | Fed. Rep. of Germany . |

OTHER PUBLICATIONS

Article by Dr. F. Wohler entitled "Removal and Recovery of Phenol and Ammonia from Gas Liquor" (Chemsa May 1979).
German-Language Excerpt from "Ullmans Encyklopädie der technisch en Chemie", 4th Edition, vol. 14.

*Primary Examiner*—Thomas Wyse
*Attorney, Agent, or Firm*—Karl F. Ross; Herbert Dubno

[57] ABSTRACT

A condensate which contains cyanide ions, hydrogen sulfide and ammonia is first partly purified by stripping with water vapor and stripped-off gases are then scrubbed with an absorbent. The laden absorbent contains 50 to 300 grams ammonia and 10 to 100 grams hydrogen sulfide and is at a temperature of 70° to 150° C. and has a pH value of at least 9. Sulfur is added to the condensate or the laden aqueous absorbent in a quantity which is at least 0.8 times the quantity that is stoichiometrically required to convert the cyanide ions to thiocyanate ions. The sulfur may be produced from hydrogen sulfide and oxygen, preferably in the presence of an oxidation catalyst. Alternatively, the sulfur may be added to a liquid which contains 10 to 400 grams ammonia and/or ammonium ions per liter so that ammonium polysulfide is formed. That solution is mixed with the liquid that contains cyanide ions.

7 Claims, 1 Drawing Figure

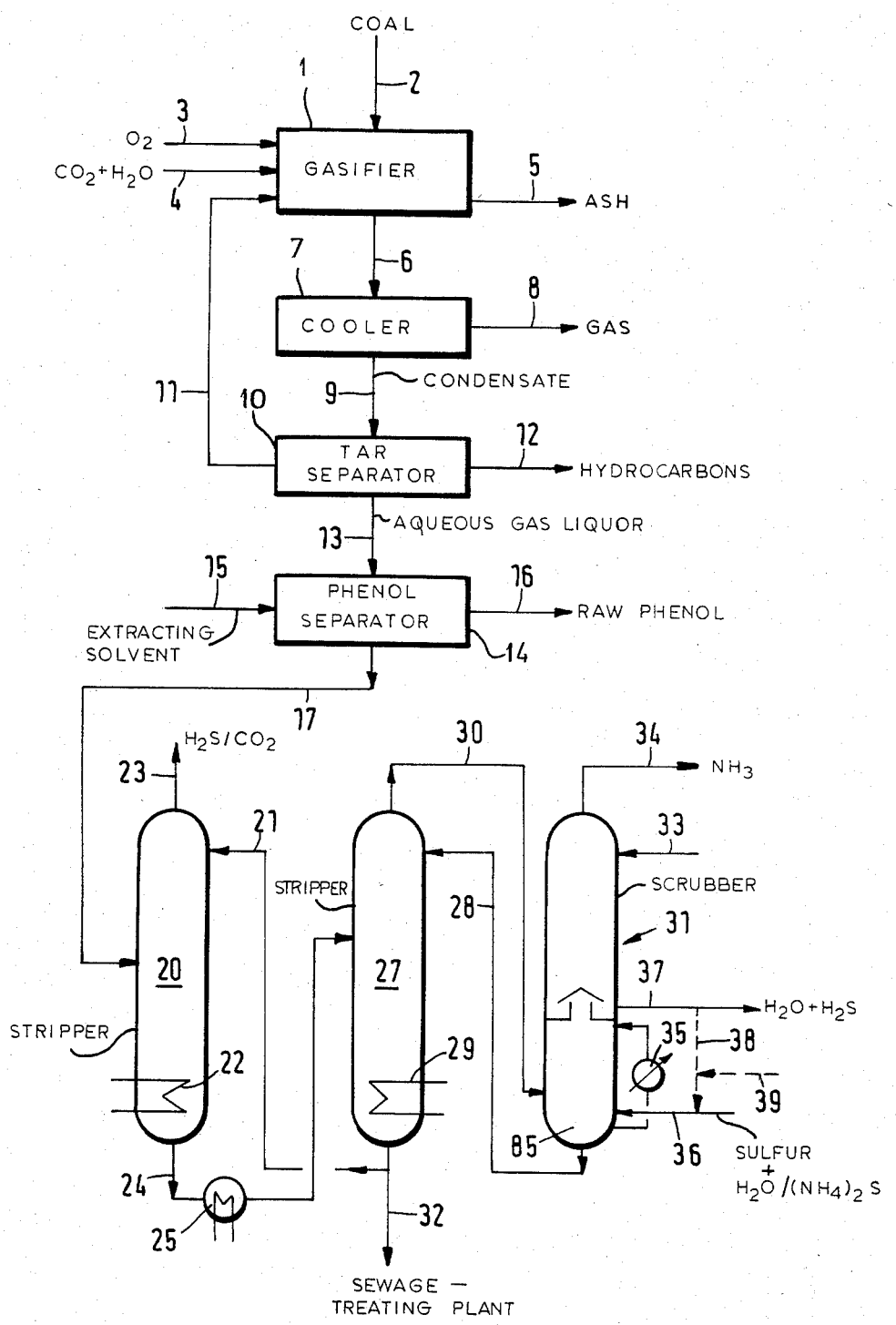

4,522,730

PROCESS FOR THE TREATMENT OF AN AQUEOUS CONDENSATE

FIELD OF THE INVENTION

Our present invention relates to a process for the treatment of an aqueous condensate and, more particularly, to the treatment of cyanide-containing condensates as are produced, for example, in the gasification and/or devolatilization of coal.

BACKGROUND OF THE INVENTION

The gasification of granular coal in a fixed bed is described in Ullmanns Encyklopädie der technischen Chemie, 4th edition (1977), vol. 14, pages 383 to 386. Details of the gasification process in which the ash remains solid are apparent from U.S. Pat. No. 3,540,867. That patent refers also to the devolatilization of the coal. The gasification of fine-grained coal in a circulating fluidized bed is described in U.S. Pat. No. 4,347,064.

The gasification and devolatilization of coal result in a formation of condensate, which must be processed. Details of such processing are apparent from German Application No. 25 42 055 and German Pat. No. 25 43 532 and the corresponding U.S. Pat. Nos. 4,031,030 and 4,065,273.

That processing results in the formation of a condensate phase which consists mainly of water but must by no means be discharged into a receiving body of water because it still contains phenols, ammonia, hydrogen sulfide, carbon dioxide and cyanide ions. The further processing of that condensate is explained in Laid-open German application Nos. 22 29 213 and 25 27 985 and in the corresponding U.S. Pat. Nos. 3,972,693 and 4,060,591. Details of that processing are also apparent from an article in "Chemsa", May 1979, pages 71 to 73.

The water obtained by the treatment of the condensate by known processes is only slightly contaminated but still contains cyanide ions. Such water has previously been delivered to a biological sewage purifying plant. But it has been found that difficulties arise also in such a plant owing to the toxicity of the cyanide ions.

OBJECTS OF THE INVENTION

It is the principal object of the invention to provide an improved method of treating such condensates.

It is also an object of the invention to eliminate the disturbing action of the cyanide ions in the process described first hereinbefore.

SUMMARY OF THE INVENTION

In the process of treating an aqueous condensate according to the invention, an aqueous condensate containing cyanide ions, hydrogen sulfide and ammonia, is subjected to stripping wherein hydrogen sulfide is driven off in part in at least one stripping column by stripping with water vapor produced by heating the condensate, stripped condensate is delivered to a sewage-treating plant, the overhead product of the stripping column is scrubbed with water under a pressure of 1 to 30 bars to remove residual hydrogen sulfide, ammonia is withdrawn in gaseous form from said overhead product, and the laden aqueous absorbent, which contains 50 to 300 grams ammonia and 10 to 100 grams hydrogen sulfide per liter and is at a temperature of 70° to 150° C. and has a pH value of at least 9, is supplied to a stripping column. Such aqueous condensate may be obtained, e.g., by a cooling of the raw gas formed by a gasification or devolatilization of solid fuels or may consist of acid water formed in refineries.

According to the present invention sulfur is supplied to the condensate or to the laden aqueous absorbent in a quantity which is at least 0.8 times the quantity that is stoichiometrically required to convert the cyanide ions to thiocyanate ions. The thiocyanate ions ($SCN^-$) can be eliminated together with the remaining impurities in the water without difficulty in sewage-treating plant, which preferably includes a stage for biological purification. Another advantage afforded by the conversion of CN ions to SCN ions resides in that the corrosiveness of the condensate which contains cyanide ions is strongly reduced.

According to a further highly preferred feature of the invention, the sulfur supplied to the condensate in order to form the thiocyanate ions is produced from hydrogen sulfide and oxygen. We have found it to be advantageous to carry out the reaction in the presence of an oxidation catalyst. Hydrogen sulfide usually becomes available as the condensate is purified, and part of said $H_2S$ can be re-used. The air is generally suitable as an oxygen source.

The sulfur is preferably added to a liquid which contains 100 to 2000 ppm cyanide ions and has a pH value of 9.5 to 11. Under these conditions the cyanide ions can be converted to thiocyanate ions in the simplest and quickest manner and the condensate or laden aqueous absorbent contains ammonia and ammonium ions in an amount of 10 to 400 grams per liter.

It is believed that the addition of sulfur results initially in a formation of ammonium polysulfide $(NH_4)_2S_x$, which reacts with the cyanide ions to form ammonium thiocyanate. But the process according to the invention is not restricted to that specific reaction sequence and it is pointed out here that the reactions taking place are so complex that all details are not known.

BRIEF DESCRIPTION OF THE DRAWING

The above and other objects, features and advantages of the invention will become more readily apparent from the following description, reference being made to the accompanying drawing in which the sole FIGURE is a flow diagram of the process.

SPECIFIC DESCRIPTION

Granular coal in particle sizes in the range of 3 to 60 mm is supplied through line 2 to a coal gasifier 1, in which the coal is gasified in a fixed bed under a pressure of 10 to 150 bars. The gasifying agents employed consist of oxygen and steam and, if desired, carbon dioxide and are supplied in lines 3 and 4. Incombustible matter is withdrawn through line 5.

The raw gas produced by the gasification is at a temperature of 300° to 800° C. and flows in line 6 to the raw gas cooler 7. The cooling is usually effected in a plurality of stages and results in a removal of part of the water vapor, dust, tars, oils, phenols, hydrogen sulfide, ammonia and cyanide ions from the raw gas, which is withdrawn in line 8. The above-mentioned substances are contained in the condensate, which consists mainly of water and initially supplied via line 9 to a tar separator 10, in which a dust-containing tar is separated, usually by gravity. The separated tar is recycled to the gasifier 1 through line 11. Hydrocarbons having different boiling points leave the tar separator 10 in line 12. A predominantly aqueous phase described as gas liquor is delivered in line 13 to the phenol separator 14. In the latter, a raw phenol is extracted by means of a solvent, such as butyl acetate or di-isopropyl ether, which is supplied through line 15. The raw phenol is delivered in line 16 to means for its further processing.

The gas liquor in line 17 has usually a temperature of 30° to 120° C. and is supplied to a first stripping column 20, which is also supplied with gas liquor that has been recycled through line 21. Water vapor is produced by a reboiler 22 in the sump of the column 20 and is used as a stripping fluid to remove 60 to 90% of the contents of $H_2S$ and $CO_2$ in the gas liquor supplied from line 17 and is subsequently withdrawn through line 23.

Hot gas liquor is withdrawn from the sump of the column 20 through line 24 and is first cooled to temperatures of 60° to 90° C. in the cooler 25 and is then supplied to a second stripping column 27, which is also fed with recycled gas liquor from line 28. As in the first stripping column 20, water vapor is produced by a reboiler 29 in the second column 27 and the overhead product is delivered through line 30 to a scrubbing column 31. Gas liquor is withdrawn from the sump of the stripping column 27 and is recycled in part in line 21; the remainder is delivered in line 32 to the sewage-treating plant.

Water at a temperature of 30° to 50° C. is supplied in line 33 to the scrubbing column 31 and is used therein to remove remaining acid gases ($CO_2$, $H_2S$ and HCN) from the rising gases and vapors so that the gas withdrawn as an overhead product in line 34 consists almost entirely of $NH_3$.

The scrubbing column 31 consists preferably of a plurality of stages and includes a lower purifying stage provided with a liquid-circulating system and a cooler 35.

A pressure of 1 to 30 bars is maintained in the scrubbing column 31 and in the stripping columns 20 and 27. Temperatures of 70° to 150° C. are maintained in the sump 85 of the scrubbing column 31 and the concentration of cyanide ions reaches a maximum in said sump. For this reason the sulfur required to convert the CN ions to SCN ions is supplied to said sump in line 36. The sulfur is supplied to the column 31 as a dispersion of finely ground elementary sulfur in water or as elementary sulfur dissolved in an aqueous solution of ammonium sulfide. The quantity of sulfur should amount to 0.8 to 1.1 times the quantity which is stoichiometrically required, if possible. Alternatively, part or all of the aqueous absorbent which is laden with $H_2S$ and withdrawn in line 37 from the upper stage of the scrubbing column may be conducted in the line 38, indicated by a dotted line, and oxygen may be supplied through line 39 to said line 38. Sulfur can thus be produced in the presence of an oxidation catalyst, such as activated carbon. The sulfur will be dissolved in the surplus absorbent and is recycled through line 36 to the sump 85. Under the conditions stated, the conversion of the CN ions takes place quickly as a result of the addition of sulfur so that the content of CN ions in the aqueous absorbent supplied in line 28 to the second stripping column 27 is negligible. As a result, an aqueous effluent which contains about 0.1 to 5 ppm cyanide ions can be supplied through line 32 to the sewage-treating plant, not shown. Moreover, the corrosiveness of the aqueous absorbent recycled in line 28 has been reduced.

SPECIFIC EXAMPLES

EXAMPLE 1

In a plant for gasifying coal, gas liquor at a temperature of 40° C. becomes available in line 17 at a rate of 1000 m³ per hour. That gas liquor contains 15,000 mg $NH_3$, 30,000 mg $CO_2$, 1000 mg $H_2S$ and 50 mg HCN per liter. If no sulfur is added, the HCN will be enriched in the solution 28 to 1500 mg/l at a temperature of 90° C. Sulfur at a rate of 55 kg per hour is dissolved in liquid which is supplied from line 37 at a rate of 10 m³ per hour and contains 20 grams ammonium sulfide per liter. The liquid containing the dissolved sulfur is supplied in line 36 to the sump 85 so that the HCN content in the aqueous absorbent in line 28 is decreased to 28 mg/l. SCN is withdrawn from the plant through line 32 at a rate of 100 kg/h. The liquid in line 32 contains about 1 ppm HCN.

EXAMPLE 2

In the plant used for Example 1, gas liquor which contains 70 mg/l HCN flows through line 17 at a rate of 700 m³ per hour. To produce sulfur, aqueous absorbent at a rate of 10 m³/h is taken from line 37 and together with air at a rate of 220 m³ STP per hour is passed at temperatures of about 45° to 50° C. over activated carbon used as an oxidation catalyst. Under these conditions, about 25% of the $H_2S$ contained in the aqueous absorbent are converted to elementary sulfur. That sulfur reacts with the remaining ammonium sulfide of the aqueous absorbent to form ammonium polysulfide, which is delivered through line 36 to the sump 85 of the column 31. In that sump, the sulfur compound reacts with the HCN to form SCN so that the condensate discharged through line 28 contains HCN not in excess of 10 ppm. The HCN content in line 32 is below 1 ppm.

We claim:

1. A process for treating an aqueous condensate containing cyanide ions, hydrogen sulfide and ammonia which comprises the steps of:
   (a) stripping said aqueous condensate by heating a portion thereof to produce water vapor and contacting the water vapor with said condensate to remove hydrogen sulfide from said condensate;
   (b) recovering from step (a) an overhead product and scrubbing same with water under a pressure of 1 to 30 bar to remove residual hydrogen sulfide therefrom while discharging ammonia in a gaseous form from said overhead product to produce an aqueous laden absorbent containing 50 to 300 grams ammonia and 10 to 100 grams of hydrogen sulfide per liter at a temperature of 50° to 150° C. and a pH value of at least 9;
   (c) passing said laden absorbent to at least one stripping column in which the stripping of hydrogen sulfide from said condensate is effected as recited in step (a); and
   (d) introducing sulfur to the laden absorbent or to said condensate in a amount at least 0.8 times the quantity stoichiometrically required to convert the cyanide ions therein to thiocyanate ions.

2. The process defined in claim 1 wherein the sulfur is produced from hydrogen sulfide and oxygen.

3. The process defined in claim 2 wherein the sulfur is produced from hydrogen sulfide and oxygen in the presence of an oxidation catalyst.

4. The process defined in claim 1 wherein in step (d) the sulfur is added to a liquid which contains 100 to 2000 ppm cyanide ions and has a pH of 9.5 to 11.

5. The process defined in claim 4 wherein the sulfur is added to a liquid which contains 10 to 400 grams of ammonia or ammonium ion per liter.

6. The process defined in claim 1 wherein the sulfur is added to a liquid which contains 10 to 400 grams of ammonia or ammonium ion per liter.

7. The process defined in claim 1 wherein, following stripping, condensate is obained which contains about 0.1 to 5 ppm of cyanide ions and is supplied to a sewage treatment plant.

* * * * *